United States Patent [19]

Block

[11] 4,279,149
[45] Jul. 21, 1981

[54] PROCESS FOR MEASURING THE LEVEL OF METAL IN VESSELS, ESPECIALLY IN CONTINUOUS CASTING MOLDS

[75] Inventor: Franz-Rudolf Block, Roetgen, Fed. Rep. of Germany

[73] Assignee: ARBED Aciéries Réunies de Burbach-Eich-Dudelange, Société Anonyme, Luxembourg, Luxembourg

[21] Appl. No.: 87,708

[22] Filed: Oct. 24, 1979

[30] Foreign Application Priority Data

Oct. 25, 1978 [LU] Luxembourg .............................. 80410

[51] Int. Cl.³ .............................................. G01F 23/28
[52] U.S. Cl. .................................................. 73/290 R
[58] Field of Search ......................... 73/290 R, 304 R; 324/204

[56] References Cited

U.S. PATENT DOCUMENTS

| 3,326,043 | 6/1967 | Roeske et al. | 73/290 R |
| 3,366,873 | 1/1968 | Miller et al. | 73/290 R X |
| 3,519,060 | 7/1970 | Vischulis | 324/204 X |
| 3,834,234 | 9/1974 | Kobayashi et al. | 73/290 R |
| 3,962,919 | 6/1976 | Playfoot et al. | 73/290 R |
| 4,164,146 | 8/1979 | Du Vall et al. | 73/304 R |

FOREIGN PATENT DOCUMENTS

| 1243891 | 4/1964 | Fed. Rep. of Germany | 73/290 R |
| 2101729 | 1/1971 | Fed. Rep. of Germany | |
| 2757785 | 12/1977 | Fed. Rep. of Germany | 73/290 R |
| 52-24559 | 2/1977 | Japan | 73/290 R |
| 228985 | 10/1968 | U.S.S.R. | 73/290 R |

Primary Examiner—Gerald Goldberg
Assistant Examiner—Joseph W. Roskos
Attorney, Agent, or Firm—Karl F. Ross

[57] ABSTRACT

A method of measuring the level of molten metal in a continuous casting mold comprises inducing in the molten metal a magnetic field by a primary electrically energized coil and, by the relationship of this magnetic field to a pair of symmetrical secondary coils coaxial with the primary coil, inducing voltages in these secondary coils which are electrically connected in a circuit opposition so that the resultant voltage represents the level of the molten metal.

12 Claims, 3 Drawing Figures

PROCESS FOR MEASURING THE LEVEL OF METAL IN VESSELS, ESPECIALLY IN CONTINUOUS CASTING MOLDS

FIELD OF THE INVENTION

The invention relates to a process for measuring the level of liquid metal in a mold, especially in a continuous casting mold.

BACKGROUND OF THE INVENTION

For control of the feed velocity of liquid metal, as well as the withdrawal speed, it is of utmost importance to be able to determine the bath level in a continuous casting mold.

For this purpose radioactive measuring methods were used as a rule but these methods, because of cost and also because of the requisite reliability, have resulted in investigations of still newer measuring processes.

This has led to an especially simple and advantageous electromagnetic method which is the subject of the invention and is elucidated below.

SUMMARY OF THE INVENTION

It is known that currents can be induced in a conductor traversed by a magnetic field by changes therein and that the presence of the conductor can be determined from the secondary fields of these currents. A measuring method relating thereto is described in German open application No. 2,101,729.

It is also known that the impedance of a coil changes when one inserts a conductor in the field of the coil.

Such measuring methods cannot effectively be applied to continuous casting of steel, since the highly conductive copper mold so strongly shields the field that the sensitivity of the measuring device is not satisfactory.

According to the invention, the effect of the mold is excluded. This is accomplished in that two secondary coils are provided which are disposed coaxially and symmetrically to the field generating primary coil and are electrically connected in circuit opposition so that only the asymmetry in the relationship between the liquid conductor and the coils produces an induced voltage.

BRIEF DESCRIPTION OF THE DRAWING

The basic structure of such a measuring method is illustrated diagrammatically in the sectional view of FIG. 1. In the graph of FIG. 2 the total (overall) secondary voltage dependence upon the position of the bath surface relative to the plane between the coils is shown, and in the graph of FIG. 3 the total secondary voltage dependence upon that position is represented.

SPECIFIC DESCRIPTION

The primary coil $P_1$ generates a magnetic alternating field which generates currents in the molten iron $I_E$ and in the mold $I_K$ and voltages in the oppositely connected secondary coils $S_1$ and $S_2$. With a symmetrical arrangement, the total voltage in the two coils, resulting from the magnetic primary field, is equal to zero.

The induced currents in the iron and in the mold are associated with magnetic secondary fields and also induce voltages in the oppositely connected secondary coils $S_1$ and $S_2$. On symmetry grounds, the total voltage, which results from the magnetic field induced in the mold by the primary field, disappears and only upon an asymmetry of the position of the liquid conductor to the two secondary coils, and thus the fields which induce currents therein, is there a resultant voltage induced in the secondary coils.

Figure 1:
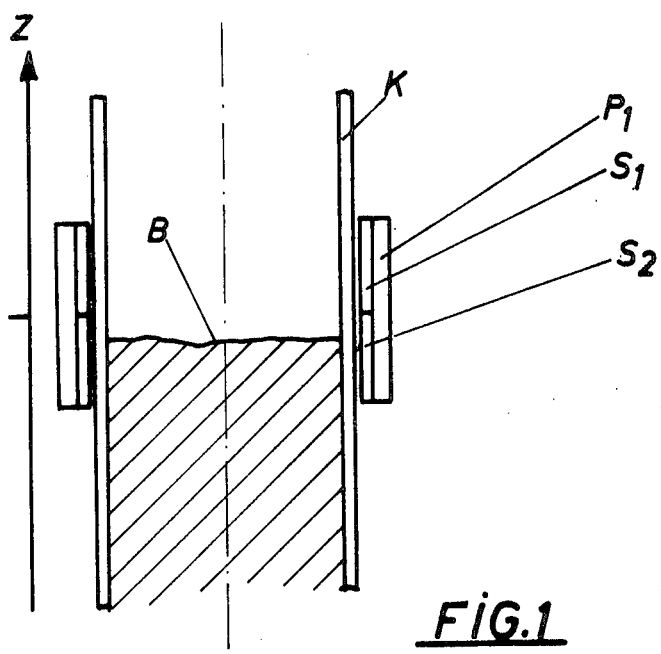
Figure 2:
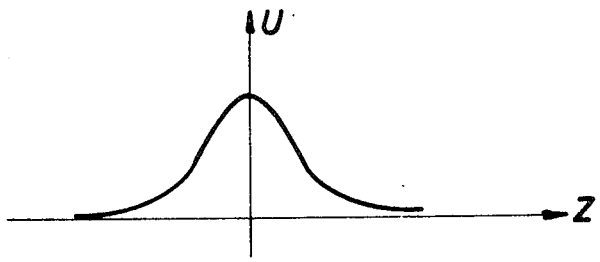

From this voltage relative to the applied primary voltage it is possible to ascertain the degree of filling:

If no metal is present in the mold, the total secondary voltage is equal to zero. As the bath level rises, voltages are induced preferentially in the lower coil, so that the resultant voltage rises. At maximum asymmetry, thus when the bath level is between the secondary coils, a maximum of the total secondary voltage is generated. As the bath level rises further the asymmetry and the total secondary voltage again disappear—see FIG. 2.

When the coil arrangement is fixed to the ingot mold—also with a constant bath level—as a result of the relative movement of the coil to the bath with each oscillation of the lifting table a passage of the curve 1 results.

When the device is so arranged that each time a passage occurs through maximum, the maximum additionally establishes a calibration value. It is self-understandable that the measured voltage is a function of the strength of the primary current, whose amplitude is in the simplest case held constant, and upon the conductivity of the bath, the latter being determined by the value of the maximum.

When the assembly is applied to a lifting table the frequency of the primary current is selected to be suitably large by comparison to the mechanical oscillation which is generally about 1 to 2 Hz in continuous casting molds for steel.

The measuring device can also serve to determine the position of a body which can lie not only below a measuring zone or in the measuring zone, but also above the latter. In this case there is a zero passage and a phase change in the induced voltage as soon as the body lies symmetrically to the coils—see FIG. 3.

For the reliability of the device a symmetrical mounting in itself and to the mold is required. This can be simply achieved with the proposed arrangement by winding the coils upon a common support.

An arbitrary disposition of the symmetrical arrangement, e.g. with the coil axis perpendicular to the mold axis, i.e. a construction similar to the Forst sensor or that described in U.S. Pat. No. 3,366,873, cannot be considered because even the smallest inclination of the coil arrangement resulting from spacing changes as a result of deformation, for example temperature changes, causes total voltages in the secondary coil arrangement, as a result of the fields which are induced in the mold by the current, which are large by comparison to the fields which the current induced in the bath, so that a measurement is impossible.

With the measuring device of the present invention, by contrast, shifts or slight inclinations and even arbitrary deformations of the coil arrangement play no role.

With the use of the detector of the present invention various methods of evaluating the measurement signal are possible, e.g.:

(1) by measuring the intensity of the induced voltage—whereby in a parallel measurement the conductivity is monitored;

(2) in the case in which the measuring pickup, as for example when the mold is in a lifting table, is oscillated relative to the bath level:

(a) determining the position of the maximum relative to the position of the table (b) determining the distance with respect to a reference signal resulting from the position of the lifting table relative to the lab system (workplace equipment).

The total voltage of the secondary coil can be changed by selecting the coil lengths of the two coils to be somewhat different or by a potentiometer in the circuit. In this way one is able, as a rule, to vary not only the level of the total voltage but also its phase relative to the phase of the primary current.

Not only the level of the total secondary voltage, but also its phase position relative to the phase of the primary current can be used to determine the position of the conductive body.

Figure 3:
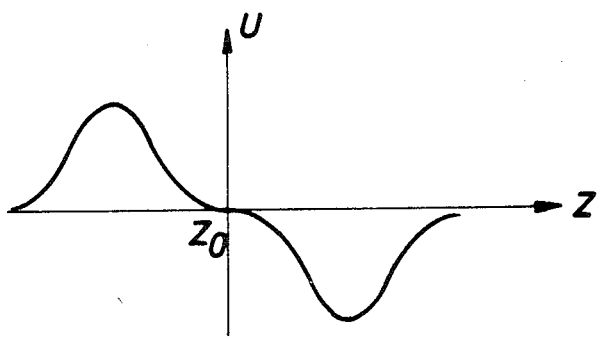

The example of FIG. 3 is especially simple since the two regions to the right and left of the zero passage differ by about $\pi$.

I claim:

1. A method of detecting the level of the top of a column of molten metal in a continuous casting mold which comprises the steps of:

surrounding the column with a primary coil and energizing the primary coil with an electric current to induce a magnetic field within the column;

disposing a pair of symmetrical secondary coils in a coaxial relationship with said primary coil and connecting said secondary coils in a circuit opposition whereby secondary currents are induced in said secondary coils by said magnetic field; and detecting the resultant voltage induced in said secondary coils, thereby deriving a value representing the position of the top of said column with respect to a plane of symmetry of said secondary coils and hence an asymmetrical orientation of said column relative to said secondary coils.

2. The method defined in claim 1 wherein said ingot mold is mounted on a lifting table which is oscillated and the detected voltage fluctuates through a maximum as a function of time resulting from the oscillation of said lifting table, said method further comprising deriving as said value, the maximum of fluctuating detected voltage.

3. The method defined in claim 1, further comprising the step of detecting the conductivity of the metal in said mold for compensating variations in said value resulting from changes in conductivity.

4. The method defined in claim 1 wherein the molten metal in said mold is electromagnetically stirred with a stirring inductor energized at a predetermined frequency, said method further comprising the step of selecting the frequency of energization of said primary coil to differ from said predetermined frequency thereby enabling discrimination between the induced voltages and voltages produced by the stirring current in said secondary coils.

5. The method defined in claim 1 wherein the primary coil is intermittently energized and voltages obtained from said secondary coils are analysed between periods of energization of said primary coil to detect background signals.

6. The method defined in claim 1 wherein said primary coil is energized with a rectangular-wave pulse.

7. The method defined in claim 1 wherein said mold is mounted on an oscillation lifting table, said method further comprising the step of triggering the energization of said primary coil in accordance with the position of said table.

8. The method defined in claim 1, further comprising step of measuring the velocity of metal flow into said mold and compensating said value for the effect of rapid flow of metal into said mold.

9. An apparatus for measuring the height of the top of the column of molten metal in a continuous casting ingot mold, said apparatus comprising:

a primary coil to induce a magnetic field in said column;

a pair of secondary coils surrounding said column and disposed coaxially with one another and with said primary coil and symmetrically while being connected in a circuit opposition, said magnetic field inducing currents in said secondary coils which are a function of the position of said column relative to said secondary coils; and means for deriving from said secondary coils a resultant voltage representing an asymmetrical position of said column with respect to the secondary coils thereby providing a value representing the height of the top of said column.

10. The apparatus defined in claim 9 wherein all of said coils are wound on a common coil carrier.

11. The apparatus defined in claim 10 wherein said coil carrier is provided with passages enabling cooling water to pass through.

12. The apparatus defined in claim 10 wherein said coils are ensheathed in a U-shaped sheet metal stack open in the direction of said column.

* * * * *